April 26, 1955
D. B. HOOVER
2,707,240
ALTERNATING AND DIRECT-CURRENT GENERATOR
Filed Aug. 19, 1950
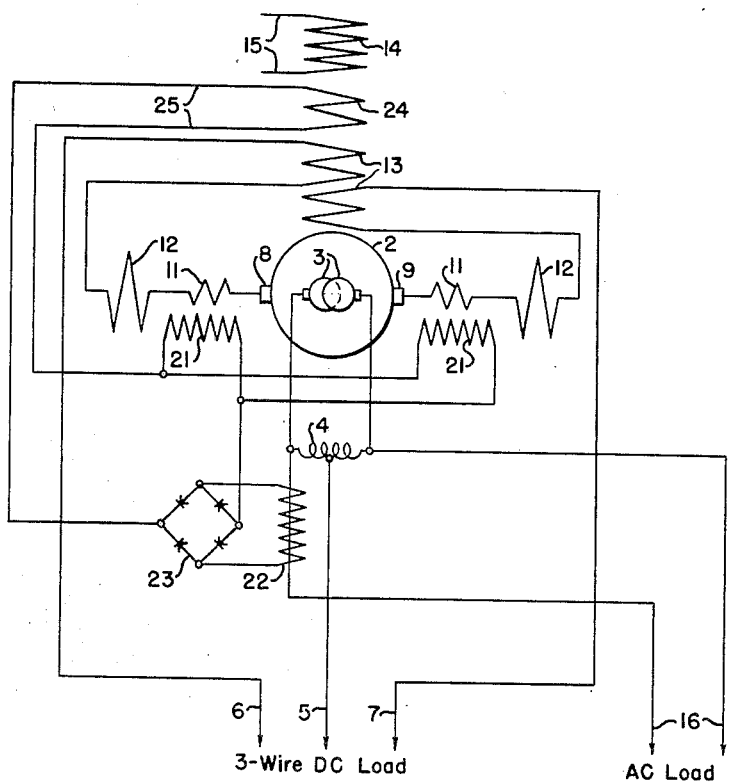
WITNESSES:
INVENTOR
Dillon B. Hoover.
BY
ATTORNEY

United States Patent Office 2,707,240
Patented Apr. 26, 1955

2,707,240

ALTERNATING AND DIRECT-CURRENT GENERATOR

Dillon B. Hoover, Pittsburgh, Pa., assignor to Westinghouse Electric Corporation, East Pittsburgh, Pa., a corporation of Pennsylvania Application August 19, 1950, Serial No. 180,392

3 Claims. (Cl. 307—26)

My invention relates to three-wire direct-current generators which are designed so that good direct-current voltage-regulation is maintained if a single-phase alternating-current load is also taken off of the slip-rings. Such a generator is described in my Patent 2,379,154, granted June 26, 1945.

In direct-current generators which have supplied both direct and alternating current, heretofore, no provision has been made for controlling the direct-current voltage-regulation, when an alternating-current load is applied to the generator. The object of my invention is to provide such regulation, by means of a series field-winding which is disposed on the main poles of the machine, and which is supplied from a rectifier which is in turn supplied with alternating current from the alternating-current load on the machine.

In the accompanying drawing, the single figure is a diagrammatic view of circuits and apparatus embodying my invention in a preferred form of invention.

A three-wire direct-current generator is shown, comprising a rotor or armature member having both a commutator-cylinder 2 and a pair of slip-rings 3, the latter being utilized to energize a balance coil 4, the mid-point of which provides the neutral conductor 5 of the three-wire distribution-system. The outside wires 6 and 7 of the three-wire distribution-system are connected to the respective brushes 8 and 9 which bear on the commutator-cylinder 2, this connection being completed through certain series field-windings which include commutating-pole windings 11, and which may also include compensating windings 12 and series exciting windings 13. In accordance with the usual practice, these series windings 11, 12 and 13 are divided into two parts, half being connected in each of the outside conductors 6 and 7 of the three-wire system. The generator is also provided with a shunt-type exciting winding 14 which may be energized from any suitable exciting-source which is indicated by the leads 15.

As explained in my previous patent, a variable single-phase alternating-current load, represented by the conductors 16, is taken off from the slip-rings 3 which energize the balance-coil 4. As also shown in my previous patent, I also provide auxiliary commutating-pole windings 21, for augmenting the effect of the series commutating-pole windings 11. These auxiliary commutating-pole windings 21 are energized, in any desired manner, so as to receive a direct-current excitation which is proportional to the alternating-current load. Any suitable means may be utilized for this purpose. The particular means which is illustrated comprises a current-transformer 22 which is connected in series with one of the alternating-current leads 16, and a rectifier-bridge 23 which converts the alternating-current output of the current-transformer 22 into direct current for energizing the auxiliary commutating windings 21. The auxiliary commutating windings 21 may be connected either in series or in parallel, and may be wound either with a large number of turns, for excitation at low current-values and a reasonably high voltage, or with a small number of turns requiring high-current excitation at a low voltage, the number of turns of the current-transformer 22 being properly chosen to give the desired current and voltage relations. I prefer to use a large number of turns of rather small wire for the auxiliary commutator-pole windings 21.

In accordance with my present invention, I provide a series exciting field-winding 24 for supplementing the action of the shunt-type exciting winding 14. This series exciting winding is energized, in any way, with direct current which is responsive to the alternating-current load of the machine. The means for providing this direct-current excitation may be either the same as, or in addition to, the means which are used for providing the direct-current excitation for the auxiliary commutating field-windings 21. In the illustrated embodiment of my invention, the series exciting winding 24 is connected, by leads 25, in series with the auxiliary commutating field-windings 21.

It will be evident that the use of the series field-winding 24 makes it possible to maintain a constant direct-current voltage-regulation, as the alternating-current load is varied, since the series field of the winding 24 will compensate for the loss of main-pole flux caused by the alternating-current armature-reaction. It will be understood, of course, that the series field of the winding 24 is a cumulative field, and that it can be adjusted in strength so as to give any desired direct-current regulation-effect, with changing alternating-current loads.

I claim as my invention:

1. A three-wire direct-current generator comprising an armature member having a commutator and slip-rings, brushes bearing on said commutator, a balance-coil energized from said slip-rings, an alternating-current load-circuit also energized from said slip-rings, a three-wire direct-current distributon-circuit having its neutral conductor connected to said balance-coil and its outside conductors connected to the respective brushes, a shunt-type exciting winding for said generator, a series exciting winding for supplementing the action of said shunt-type exciting winding, and means for energizing said series exciting winding with direct current responsive to the alternating current in said alternating-current load-circuit.

2. A three-wire direct-current generator comprising an armature member having a commutator and slip-rings, brushes bearing on said commutator, a balance-coil energized from said slip rings, an alternating-current load-circuit also energized from said slip-rings, a three-wire direct-current distribution-circuit having its neutral conductor connected to said balance-coil and its outside conductors connected to the respective brushes, series commutating-pole windings serially connected in said outside conductors, auxiliary commutating-pole windings for supplementing the action of said series commutating-pole windings, a shunt-type exciting winding for said generator, a series exciting winding for supplementing the action of said shunt-type exciting winding, and means for energizing said auxiliary commutating-pole windings and said series exciting winding with direct current responsive to the alternating-current in said alternating-current load-circuit.

3. A three-wire direct-current generator comprising an armature member having a commutator and slip-rings, brushes bearing on said commutator, a balance-coil energized from said slip-rings, an alternating-current load-circuit also energized from said slip-rings, a three-wire direct-current distribution-circuit having its neutral conductor connected to said balance-coil and its outside conductors connected to the respective brushes, series commutating-pole windings and compensating windings serially connected in said outside conductors, auxiliary commutating-pole windings for supplementing the action of said series commutating-pole windings, a shunt-type exciting winding for said generator, a series exciting winding for supplementing the action of said shunt-type exciting winding, and means for energizing said auxiliary commutating-pole windings and said series exciting winding with direct current responsive to the alternating current in said alternating-current load-circuit.

References Cited in the file of this patent

OTHER REFERENCES

| | | |
|---|---|---|
| 2,247,166 | Edwards et al. | June 24, 1941 |
| 2,308,279 | Goss et al. | Jan. 12, 1943 |
| 2,328,996 | Park | Sept. 7, 1943 |
| 2,363,856 | Fisher | Nov. 28, 1944 |
| 2,364,933 | Andrix | Dec. 12, 1944 |
| 2,379,154 | Hoover | June 26, 1945 |
| 2,419,462 | Petch, Jr., et al. | Apr. 22, 1947 |
| 2,519,272 | Miner, Jr. | Aug. 15, 1950 |
| 2,538,119 | Mironowicz | Jan. 16, 1951 |
| 2,555,539 | Graybrook | June 5, 1951 |